United States Patent [19]
Kudelski et al.

[11] Patent Number: 5,067,035
[45] Date of Patent: Nov. 19, 1991

[54] ERROR PREVENTION IN A RECORDING AND REPRODUCING DEVICE WITH AT LEAST ONE ROTATING HEAD

[75] Inventors: Stefan Kudelski, Le Mont; Jean-Claude Schlup, Cugy; Ernest Rosselet, Assens, all of Switzerland

[73] Assignee: Kudelski SA fabrique de'enregistreurs Nagra, Chesequx, Switzerland

[21] Appl. No.: 314,063
[22] PCT Filed: May 22, 1987
[86] PCT No.: PCT/CH87/00057
§ 371 Date: Mar. 17, 1989
§ 102(e) Date: Mar. 17, 1989
[87] PCT Pub. No.: WO88/09550
PCT Pub. Date: Dec. 1, 1988

[51] Int. Cl.⁵ .................. G11B 15/665; G11B 15/61
[52] U.S. Cl. ........................................ 360/85; 360/95
[58] Field of Search ................... 360/84, 65, 95

[56] References Cited

U.S. PATENT DOCUMENTS

| | | | |
|---|---|---|---|
| 3,673,348 | 6/1972 | Larkin | 179/110.2 Z |
| 3,691,315 | 9/1972 | Ellmore | 242/195 X |
| 3,697,676 | 10/1972 | Protos | 178/6.6 P |
| 3,700,152 | 10/1972 | Warren | 226/108 |
| 3,770,906 | 11/1973 | Andoh | 179/100.2 C |
| 3,911,490 | 10/1975 | Kostin | 360/84 |
| 3,943,566 | 3/1976 | Brock | 360/71 |
| 3,995,317 | 11/1976 | Schmidt | 360/109 |
| 4,025,959 | 5/1977 | Warren | 360/85 |
| 4,138,699 | 2/1979 | Ura | 360/85 |
| 4,166,283 | 8/1979 | Van Slageren | 360/95 |
| 4,212,439 | 7/1980 | Sekiguchi | 242/206 |
| 4,215,379 | 7/1980 | Lemelson | 360/85 |
| 4,255,768 | 3/1981 | Kubota | 360/10 |
| 4,264,937 | 4/1981 | Kabacinski | 360/85 |
| 4,322,761 | 3/1982 | Beitler et al. | 360/85 |
| 4,365,277 | 12/1982 | Namiki | 360/72.1 |
| 4,405,958 | 9/1983 | Hijikigawa | 360/113 |
| 4,410,919 | 10/1983 | Umeda | 360/85 |
| 4,441,133 | 4/1984 | Ogawa et al. | 360/130.22 |
| 4,558,376 | 12/1985 | Heitmann | 360/10.1 |
| 4,594,619 | 6/1986 | Hijikigawa | 360/74.4 |
| 4,703,370 | 10/1987 | Inoue et al. | 360/10.2 |
| 4,709,280 | 11/1987 | Delacou | 360/85 |

FOREIGN PATENT DOCUMENTS

| | | |
|---|---|---|
| 3127340 | 4/1982 | Denmark . |
| 3045543 | 7/1982 | Denmark . |
| 3118241 | 11/1982 | Denmark . |
| 0115275 | 8/1984 | European Pat. Off. . |
| 0180489 | 5/1986 | European Pat. Off. . |
| 2130346 | 11/1972 | France . |
| 2276653 | 1/1976 | France . |
| 2345035 | 10/1977 | France . |
| 2384318 | 10/1978 | France . |
| 2407547 | 5/1979 | France . |
| 2445585 | 7/1980 | France . |
| 2477748 | 9/1981 | France . |
| 2020878 | 11/1979 | United Kingdom . |
| 2020879 | 11/1979 | United Kingdom . |
| 2054940 | 2/1981 | United Kingdom . |
| 2078431 | 1/1982 | United Kingdom . |
| 2155685 | 9/1985 | United Kingdom . |

OTHER PUBLICATIONS

IBM Technical Disclosure Bulletin, vol. 9, No. 8 1/67 (New York, US), R. B. Johnson et al., "Automatic Tape Threading", p. 968.
Patent Abstracts of Japan, vol. 7, No. 164 (P-211)(1309), 7/19/83, and JP, A, 5870449 (Sony), 4/26/83.
Patent Abstracts of Japan, vol. 3, No. 124 (E-144), 10/17/79 & JP, A, 54101303 (Matsushita 9/8/79).
Proceedings of the Conference on Video and Date Recording, IERE Conference Proceedings, No. 43, Jul. 24-27, 1979, J. C. Mallinson: "Towards 1000 Mega-Bit Per Second Magnetic Recording", pp. 267-274.

Primary Examiner—John H. Wolff
Attorney, Agent, or Firm—Marks, Murase & White

[57] ABSTRACT

A recorder/reproducer having two capstans which engage a magnetic tape passing from a delivering coil holder to a receiving coil holder of a cartridge is disclosed. At the time of loading the tape, the capstans are shifted from a rest position along a path toward the scanner which has an upper, rotatable drum. In this working position, the capstans are in close proximity to the scanner which eliminates the great lengths of the tape which generate undesired longitudinal vibrations in the tape.

3 Claims, 10 Drawing Sheets

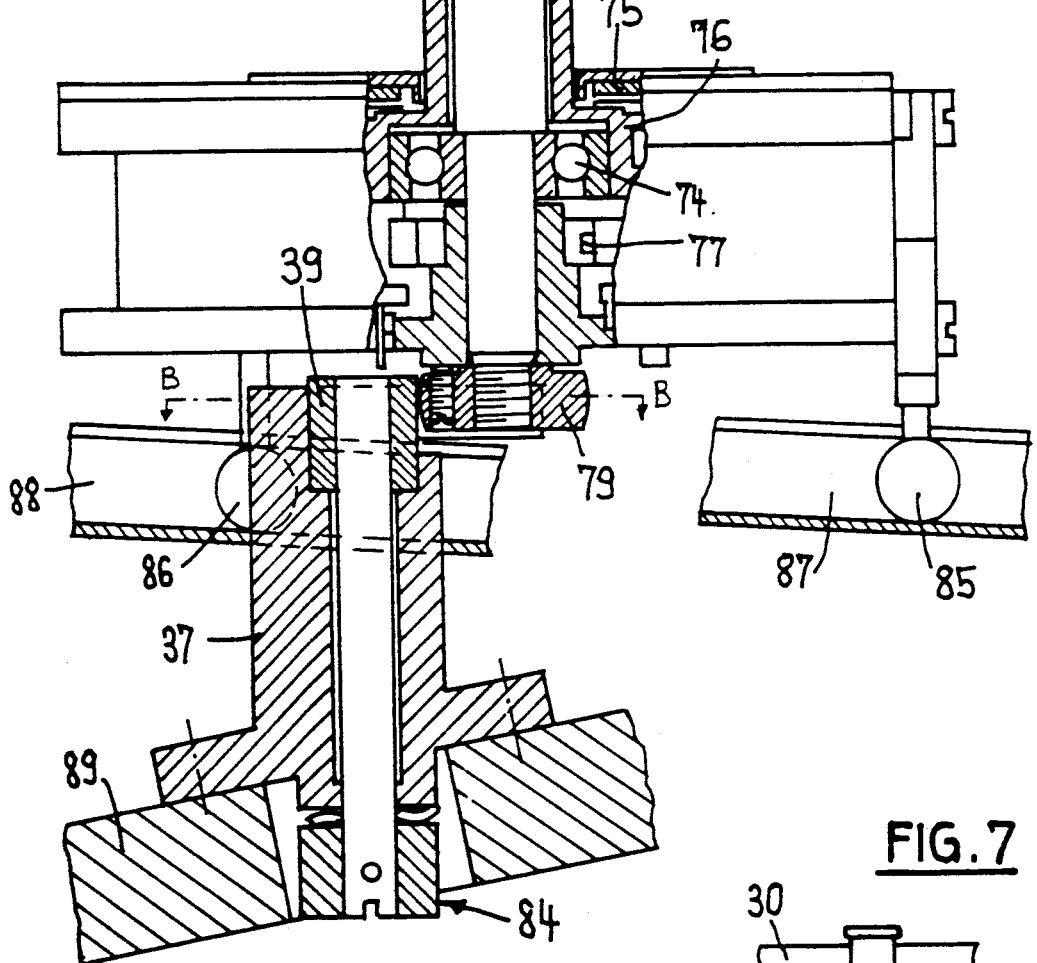
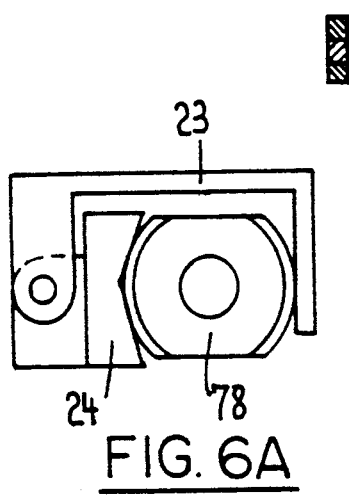
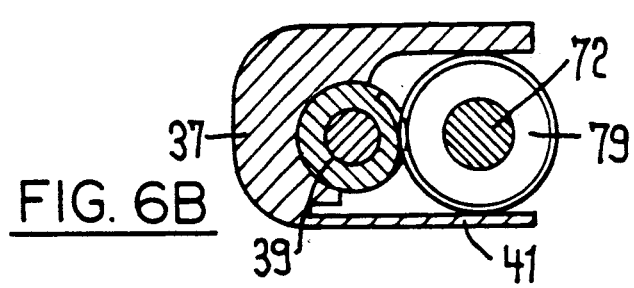
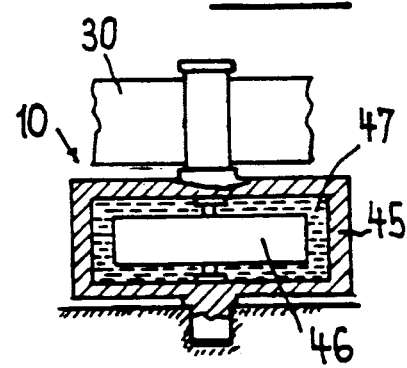

IDABLE DEVICE WITH AT LEAST ONE
ROTATING HEAD

TECHNICAL FIELD

The present invention relates to a recording device such as a magnetic recording device with rotating head or heads with helical scanning.

PRIOR ART

The recording of data, whether analog or numerical, is almost always executed within a layer of very small thickness deposited on a support in the form of a flexible film. This is true for, e.g., writing on paper, photorecording and, above all, of the magnetic recording.

The analog magnetic recording of sound necessitates a relatively small speed between head and tape. On the other hand, since the signal/noise ratio of the recording is proportional to the utilized surface of the tape, the recording track has to be sufficiently wide. This is the reason why in the usual process, the tape moves in front of a stationary head.

For analog recording of a video signal or any numerical recording, the signal/noise ratio is less critical which permits the width of the recorded track to be greatly reduced. On the other hand, since the number of magnetic transitions per second is very high, one has to foresee a great relative speed between head and tape. For example, the professional analog recording of sound is generally executed at 19.05 or 38.1 cm/sec on a width of 2 to 6 mm, while the professional analog recording of a video signal (format C) is executed at a relative speed between head and tape of 25 m/sec but on a width of only 0.16 mm. Such a narrow tape moving at such a great speed is not practical. Therefore, since about 1950, the universally adopted solution for the recording of video signals in practice, makes use of mobile, rotatable heads which scan the surface of the magnetic tape.

Originally, this scanning was executed transversally, i.e., where the axis of rotation of the rotating head or scanner was parallel to the direction of the movement of the tape (format Quadruplex). Today, almost all new recording devices make use of helical scanning, i.e., where the tape moves helically about a cylinder, a portion of which is generally stationary and another portion of which is rotatable. This rotatable part comprises one or more magnetic heads which, due to the helical winding of the tape, scan the surface of the latter diagonally. The longitudinal component of the motion of the tape has the effect that the recorded tracks are not superimposed but that they are arranged like hatchings in a drawing.

In the devices actually known the tape is driven by the receiving coil of the tape and by a capstan in the form of a cylinder generally rotating at constant speed. Between these elements and the scanner, one finds various elements, like magnetic heads, provided for the auxiliary longitudinal tracks, a counting roll measuring the longitudinal path of the tape and various tape guides, among them the input and output guides of the scanner. These latter guides are generally stationary but in certain cases they can be rotatable (e.g., Ampex Nagra VPR 5).

The preceding shows that in all known cases there exists between the scanner and the capstan a relatively great length of tape. The rotation of the scanner, combined with the frictional effects in the guides, causes longitudinal vibrations in the tape which are only stopped by the capstan. These vibrations deteriorate the quality of the signal of the analog, as well as the numerical, recording.

SUMMARY OF THE INVENTION

The object of the present invention is to improve the performances of the recorder.

The free length of the tape between the scanner and the capstan or capstans is greatly reduced if the capstan or capstans is/are provided in close proximity to the scanner. In this case, it is necessary to take measures for facilitating the loading of the tape. This is obtained by making the capstan displaceable in rails, such that it is capable of being shifted from one position where it engages the tape in the cartridge to a working position near the scanner. A variant of the invention aims to realize recordings at variable speed. In this case, it is necessary to correct the angle error of the tracks recorded on the tape, due to the modification of the longitudinal speed of the tape. This correction is realized in the present invention by the adjustment of the angle of the helix of a helical ramp or guide of the tape, having variable geometry and located in the stationary part of the scanner and/or by the axial displacement of a recording head on the scanner.

BRIEF DESCRIPTION OF THE DRAWINGS

FIG. 6 shows cross-sectional side views of the capstan and its motor, FIGS. 6A and 6B show breakaway views of portions of FIG. 6, FIG. 7 shows a passive capstan.

DETAILED DESCRIPTION OF THE INVENTION

Figure 1:
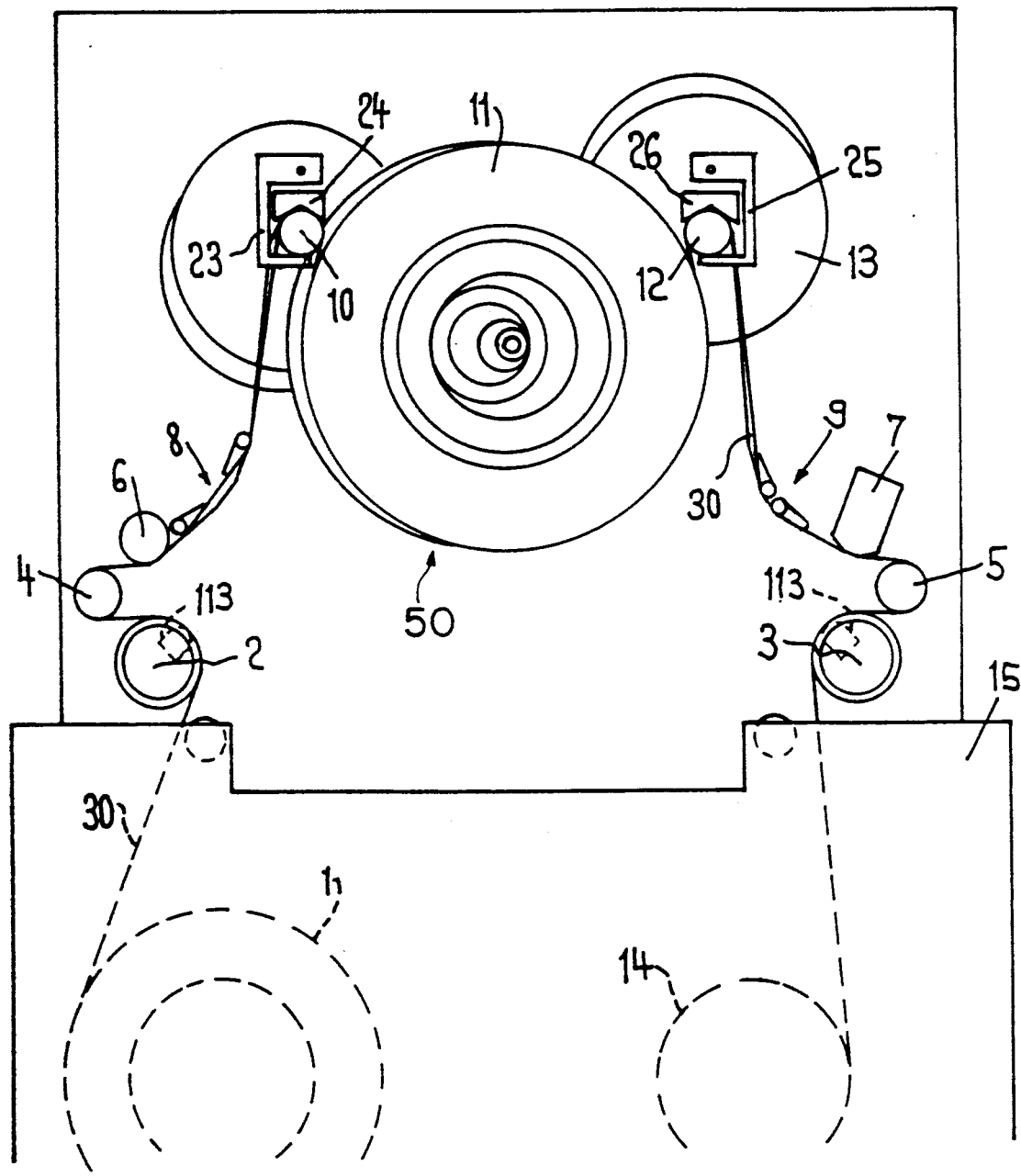
FIG. 1 shows the working position of the capstans at close proximity to the scanner.

FIG. 1 shows the recorder with the capstans in working position. The recorder comprises a first input capstan-guide 10 and a second output capstan-guide 12. The tape 30 leaves the cartridge 15 by the cartridge delivery spool 1 and it is received in the cartridge receiving spool 14. At the outside of the cartridge 15, the tape passes on guides 2 and 3 which comprise also the magnetic heads for the auxiliary longitudinal tracks which have to operate when the tape is not engaged on the scanner, for example during fast windings. The tape then passes on tensiometers 4 and 5 which are pulleys mounted on pivoting arms for tensioning the tape and measuring its tensile stress in order to inform the control circuits about the tensile stress in the tape. The tape is then displaced in front of the principal magnetic heads 6 and 7 for erasing, recording or reproducing the information recorded in the longitudinal tracks. Elements 8 and 9 represent non rotatable guides of complex form permitting a change of plane. The tape in the cartridge and on the elements 2 to 7 moves in parallel with the base of the device. On the other hand, from the guides 8 and 9 it comes down on one side and goes up at the other side in order to join the helix of the scanner. The guides 8 and 9 provide for constant tensile stress toward the top as well as toward the bottom of the tape. Each of these guides may consist of two warped cylinders. Between the two capstans 10 and 12, the tape passes on a rotatable drum 11 of the scanner which may comprise a plurality of magnetic heads. 13 illustrates a coding motor of the output capstan 12.

Figure 13B:
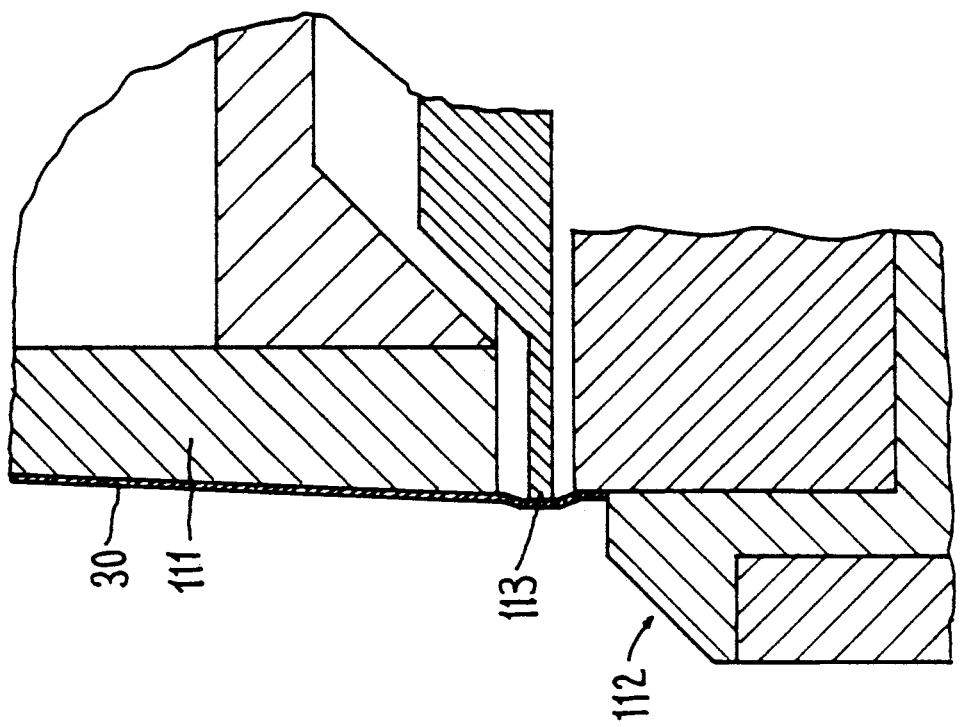
FIGS. 13A and 13B show the construction of the guides 2 and 3 of FIG. 1.
Figure 13A:
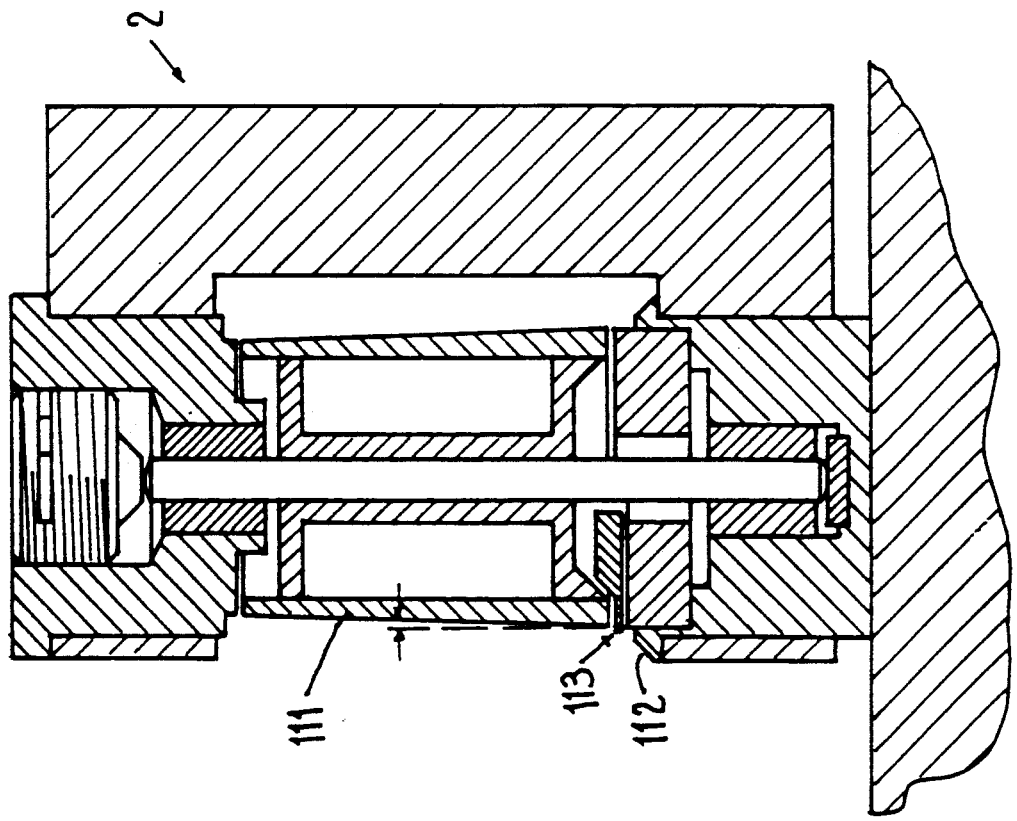

FIGS. 13A and 13B show the construction of the tape-guides 2 and 3. In any driving device of the tape, the guiding of the latter is a difficult problem to solve. Indeed, it is necessary to avoid floating of the tape caused by a lateral play. It is also necessary to avoid a friction between guide and tape which would produce an undesirable loss of tensile stress as well as longitudinal, particularly disturbing vibrations. This is the reason why one does not use stationary guides. In the present invention, the guides are comprised of two parts, a rotatable slightly conical part 111 with an angle of conicity of e.g. 45 minutes and a fixed part 112 on which abuts the tape 30 and which possibly bears an auxiliary recording or reproducing head 113. The presence of the cone has the effect of drawing the tape toward the bottom, against the fixed part so that any lateral play is avoided. Moreover, the friction is also diminished because the tape moves on the upper, rotatable part 111.

Figure 2:
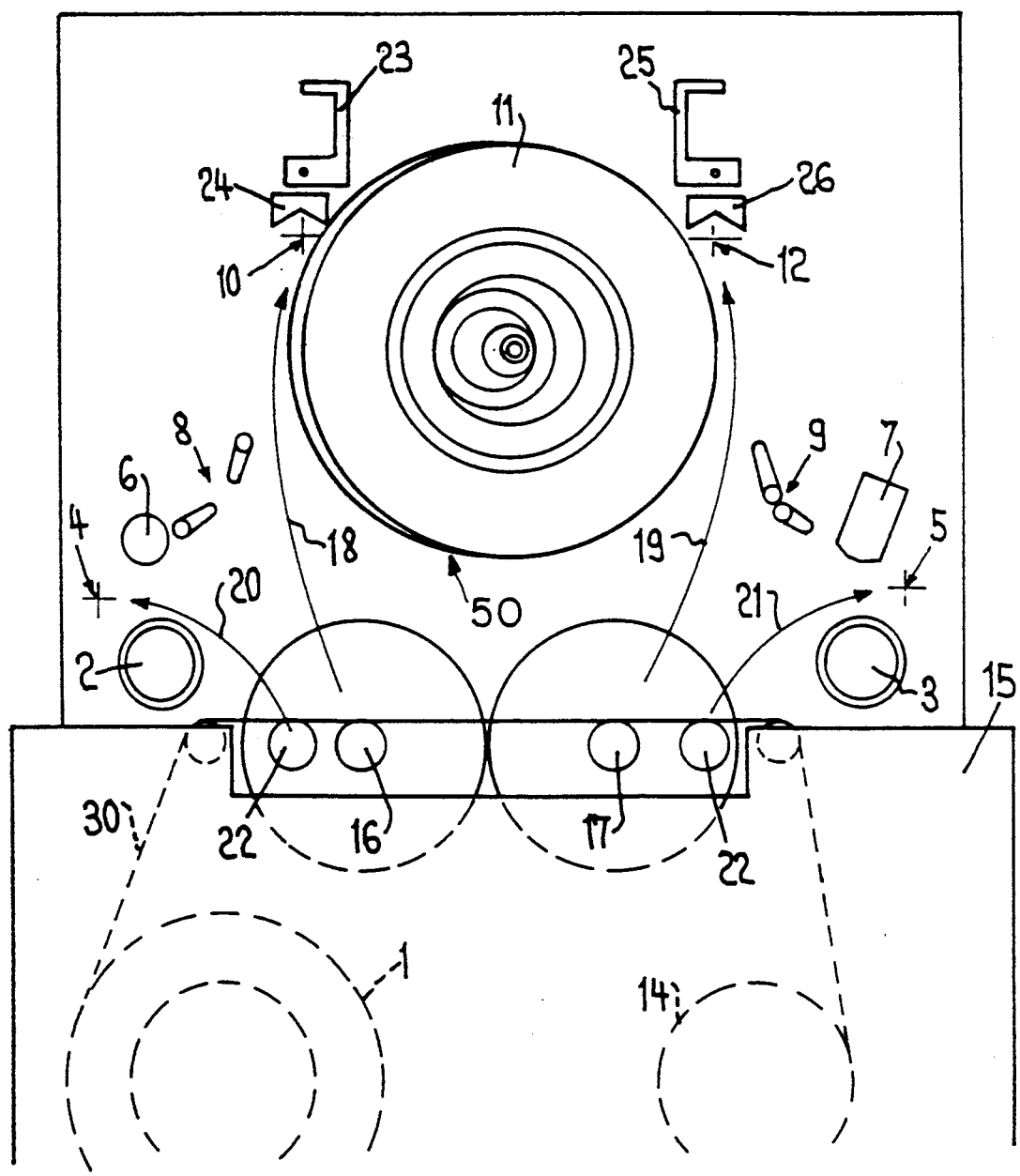
FIG. 2 shows the capstans engaged in the magnetic tape cartridge.
Figure 3:
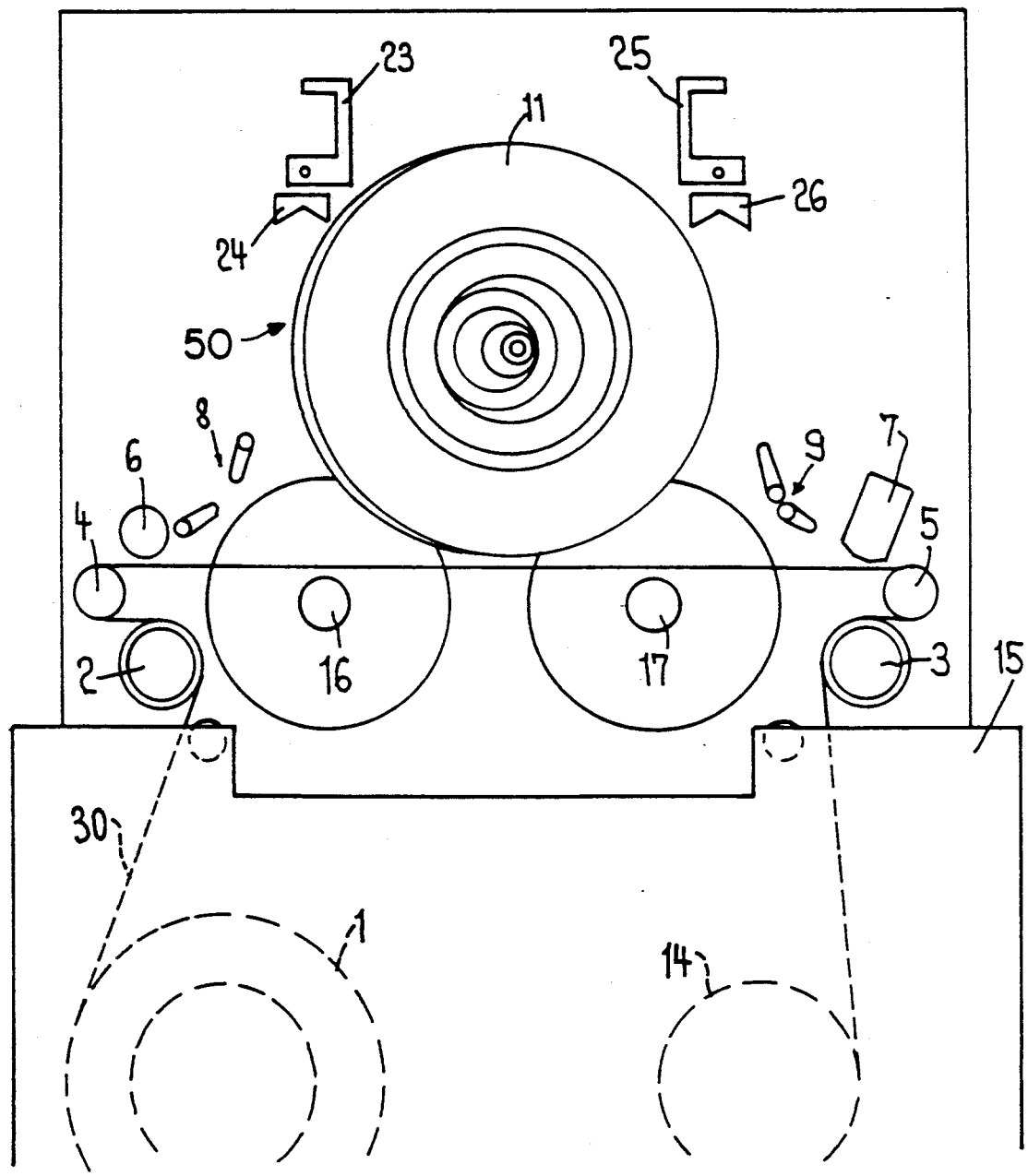
FIG. 3 shows an intermediate position of the capstans.

FIG. 2 shows the loading mechanism of the tape. The cartridge 15 is at first inserted horizontally in the apparatus and then it is lowered. During the phase of lowering, its door (not represented) opens and it is engaged by the capstans 16 and 17 and by the rolls of the tensiometers 22, which pass behind the tape 30. The rolls of the tensiometers 22 driven by a cable coupled to the same winch as the capstans move then along the paths 20 and 21 in order to reach their working position. In the present invention, the tensiometric arms have also the function of extracting the tape from the cartridge. During this operation, the capstans 16 and 17 come also out of the cartridge 15 and they are shifted toward the scanner 50 in accordance with the paths indicated schematically by the arrows 18 and 19, but the transmission is so designed that they stop before coming into contact with the tape 30, as shown in FIG. 3. This position of the tape is utilized to rewind the tape at great speed without the latter rubbing on the scanner 50 of FIG. 3. The rotatable guides 2 and 3 comprise also auxiliary magnetic heads for the track bearing the time code track which permits a reading during the windings.

Figure 4:
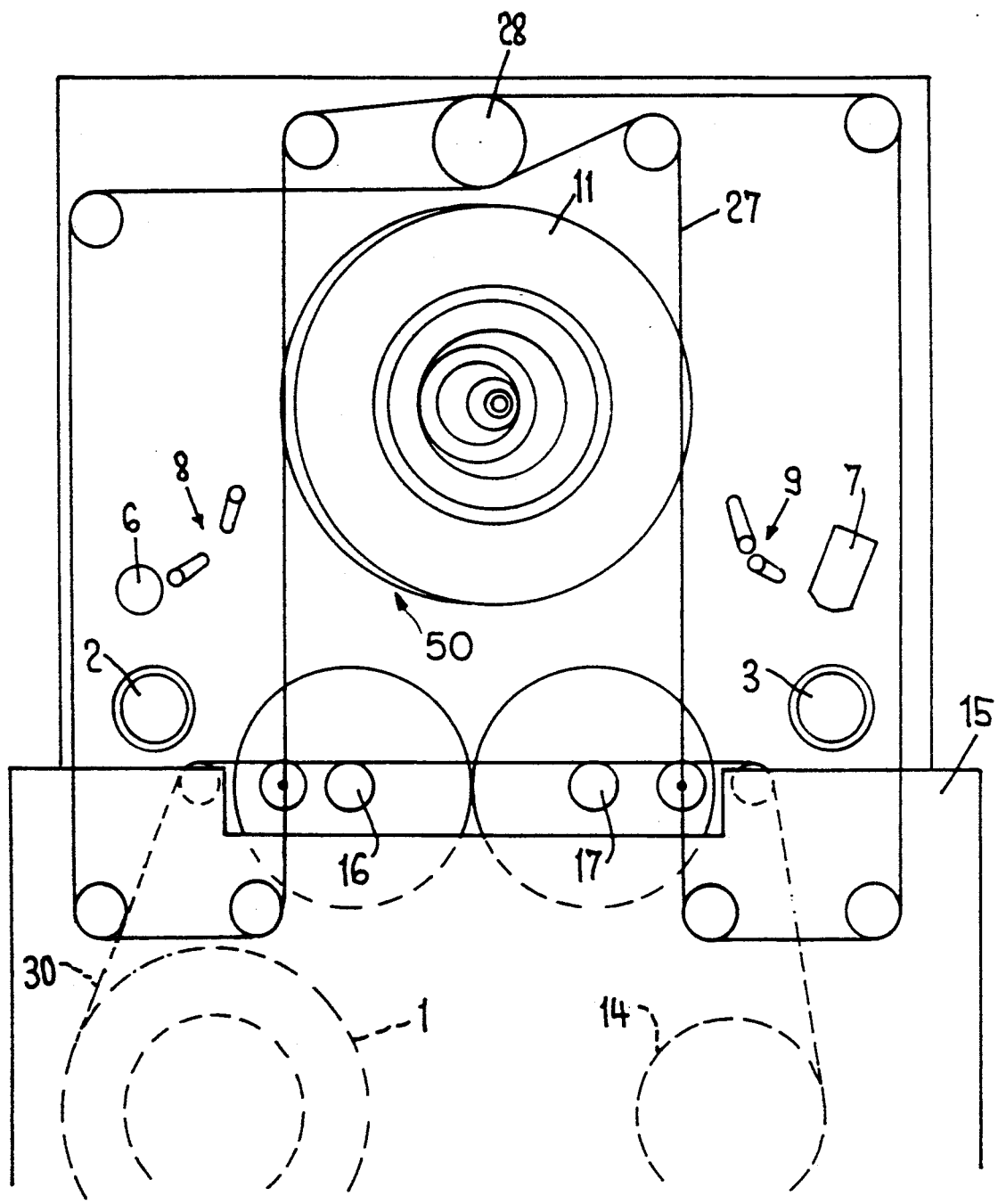
FIG. 4 shows the winch utilized for the displacing the capstans toward the scanner.
Figure 5:
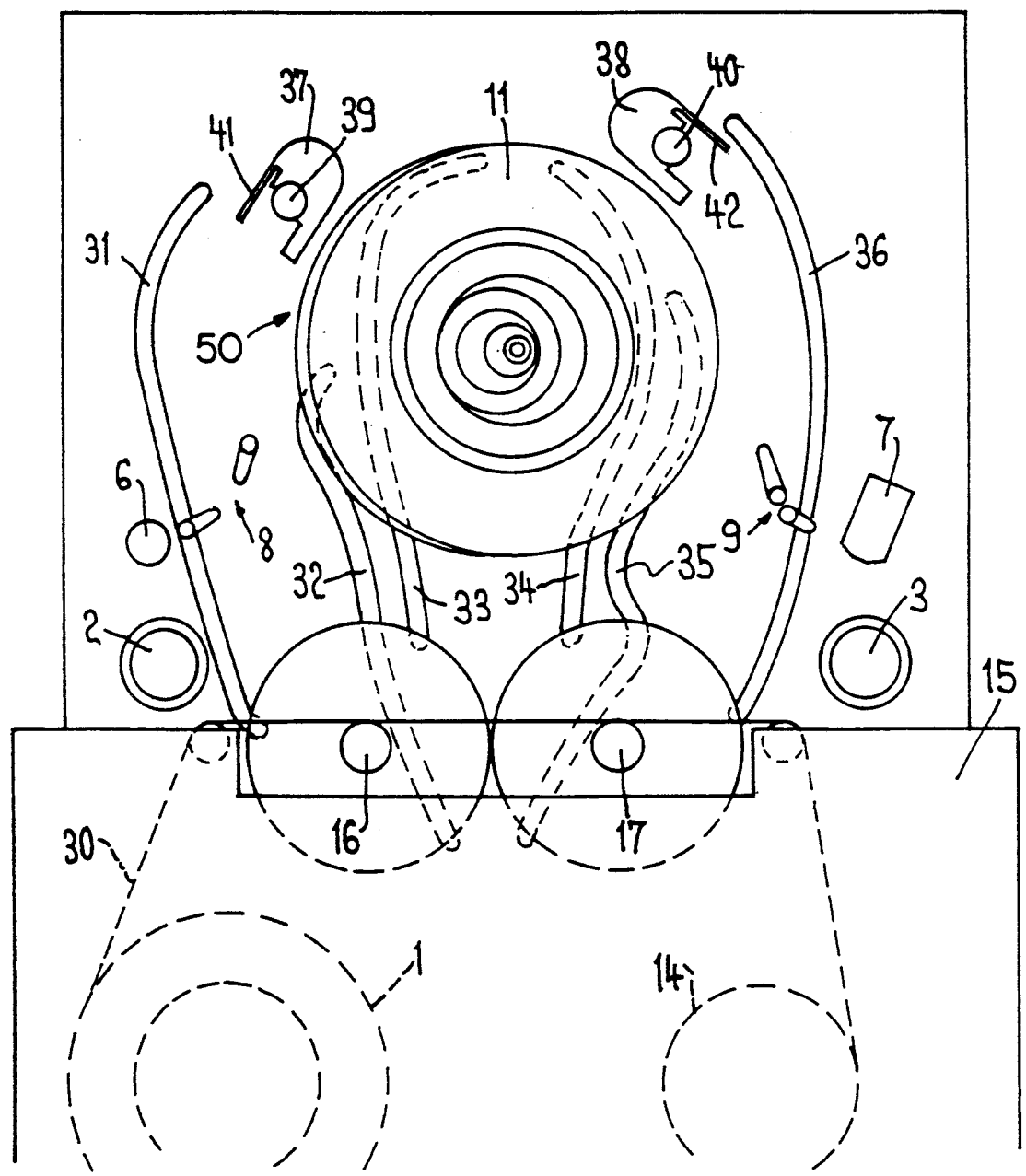
FIG. 5 shows the guiding rails of the capstans.

FIG. 4 shows the mechanism for the shifting of the capstans toward the scanner 50. The capstans are shifted by a cable 27 driven by a winch 28. In a tape driver with helical scanner, almost all the axes are warped. Now, it is important for avoiding damaging of the tape, to deal with it like a flat surface, to allow for a small torsion, above all uniformly distributed on the width of the tape (not surpassing generally an angle of one degree for a length equal to the width of the tape. In order to obtain this result, the axis or axes of the capstan or capstans must take well determined inclinations at each position during their displacement. In the present invention, the supports of the bearings of the capstans which are in practice their motors, are made each sliding or rolling on three independent rails 31–33 and 34–36 as illustrated in FIG. 5, the variable heights along these rails being so designed that the axes of rotation of the capstans take the required spatial orientations. Each capstan motor comprises three feet terminated by spheres at its lower part. These spheres slide in the rails 31 to 36 which are in form of tubes with a longitudinal slit. This arrangement permits the rails to have very complicated configurations and more particularly to guide them up or down. This provides not only the required changes of levels to permit the joining of the horizontal path of the tape in the cartridge to the helical path of this same tape on the scanner, but also provides at each position the optimal inclination of the capstan in order to avoid damaging the tape.

When the capstan arrives at its working position in close proximity to the scanner, it is locked in this position by V-shaped upper abutments 24 and 26 illustrated in FIGS. 1 and 2. This is feasible because the rails are splayed at the location which corresponds to this working position, which permits a certain play to the capstan. The axis of the capstan is terminated at both extremities by truncated spheres, which in the normal working position of the capstans, come in contact with the upper abutments 24 and 26 thus positioning these capstans with great accuracy while tolerating changes of the orientation of their axis. The V-shaped upper abutments 24 and 26 are shown in FIG. 1. Mobile clasps 23 and 25 illustrated in locking position in FIG. 1 and in open position in FIG. 2, press the extremities of the axis of the capstan against these abutments. The lower abutments 37 and 38 are illustrated in FIG. 5. The elements 39 and 40 are mobile cams the rotation of which displaces the lower extremity of the axis tangentially to the scanner and consequently also its angle of orientation with respect to the axis of the scanner. This adjustment which can be servo-controlled permits correcting of errors of geometry due to the modification (which will be described later on) of the angle of the helix of a guiding ramp for the tape having variable geometry as well as optimizing the movement of the tape as a function of its orientation, speed, characteristics, etc. The adjustment can be controlled by transducers which measure the pressure with which, in the example described, the lower edge of the tape presses on the helical ramp or also the space between this edge of the tape and points of reference. Indeed, the modification of the angle of the axis of the capstan causes the tape to go up or down on the scanner. The elements 41 and 42 of FIG. 5 are springs for taking up the play which position the extremity of the axis of the scanner in the radial direction with respect to the scanner.

FIG. 6, 6A and 6B shows a sectional view of the capstan 10 and of its motor with the rotor 76. One recognizes the abutment 24 with its fastening element 23 as well as the abutment 37 and the rotatable stop cam 39 controlled by a lever 84 and which permits tilting of the fixed axis 72 of the capstan by a servo-mechanism not represented in order to improve the movement of the tape. The axis 72 of the capstan terminates on each side by truncated spheres 78 and 79 which are provided in the abutments 24 and 37. FIG. 6 shows also spheres 85 and 86 terminating the feet (3 feet) of the motor, these spheres sliding in the rails 87 and 88 of tubular form with a longitudinal slit as mentioned previously, these rails guiding the motor of the capstan during its shifting from the position illustrated in FIG. 2 toward the working position. A rotatable transformer 77 transmitting to the stator the signals delivered by the encoder measuring the speed and the position of the rotor. 89 represents the frame of the device. The capstan 10 rotates on a ball bearing 74 which is prestressed by a permanent magnet 75. Indeed, in order to work correctly, a cylindrical ball bearing must support a certain prestress for ensuring that the balls rotate instead of sliding. Usually, this prestress is obtained using a second ball bearing and springs.

In our case, it is very important that the friction which opposes the rotation be as small and constant as possible because the torque of the motor is determined by the measurement of the current consumption. The value of this torque is utilized for controlling the tensile stress of the tape at the location of the spools. Indeed, the capstan can be without pressure roll. Then, the difference of tensile stress of the tape before and after the capstan must be small in order to avoid sliding. To this end, the motor, which supports the spool, pulls more or less strongly on the tape and it is the torque of the capstan which controls this tensile stress. When replacing the second ball bearing by a magnetic prestress which is practically without losses, one reduces substantially the losses by friction.

The recorder according to the invention accepts also passive capstans. Usually, the capstans are active which means that being driven by a motor, they contribute to the drive of the tape. But it is also possible to utilize passive capstans which are driven by the tape and have the function to stabilize the speed of the tape. This can be done by pure mechanical means combining e.g. the inertia and attenuating devices or by electronic means such as a combination of speed sensors or of sensors sensing variations of the speed and motors which behave like artificial masses with attenuations. FIG. 7 shows schematically a passive capstan 10 coupled to an inertial mass 45 in which is provided a rotatable mass 46 bathed in oil 47 and serving as an attenuator.

The preceding shows that the loading of the tape is greatly facilitated by the shifting of the capstans which is foreseen between the position at the inside of the cartridge in which the tape passes without any difficulty on the capstans 16 and 17 and the tensiometers 4 and 5, between the delivering and receiving coils 1 and 14. When the tape is so disposed, the shifting of the capstans from the positions 16 and 17 to the respective positions 10 and 12 permits an automatic setting in place of the tape in the recorder.

In the recorders with a helical scanner, there is also a to solve the problem of guarantying that at the time of a subsequent reading, the reading head passes exactly on the tracks recorded previously. To this end, it is advantageous to guide laterally the tape during its travel on the scanner. A universally utilized method consists of providing the non rotatable drum of the scanner with a helical guide called a "ramp" on which the tape leans. The direction of the recorded tracks on the tape with respect to its lower edge which is generally taken as a reference, is determined by the vectorial combination of the scanning movement of the rotatable head or heads and of the movement of translation of the tape itself. In order to read a tape moving at a speed different from the one utilized for the recording, and more particularly a tape at a standstill (viewing of a stationary image), the reading head has to follow a trajectory somewhat different from the one that it follows normally, in order to compensate the partial or total absence of movement or translation of the tape. A well known method consists of operating with a reading head ,not rigidly fixed to the rotatable drum of the scanner, in order to correct the error mentioned above with respect to the trajectory. These movements of the heads are very rapid because they are bound to take place at the rhythm of the rotation of the scanner with a very sudden return for the beginning of the following track. However, these movements (e.g., system AST Ampex) are not to be confounded with the controlled, slow displacements which are very much less capable of being disturbed by the accelerations and which will be discussed later on. This known method is well suited for the apparatuses with few heads which operate in an environment not submitted to important accelerations like the ones which arise in the aircrafts.

If the problem is not to read but to record at variable speed, the absolute positioning of the recording head causes very serious problems because of the few place and energy at disposal in the scanner and further because of the radial (up to 6000 g) and axial accelerations. Another known solution of this problem consists of inclining the axis of rotation of the rotatable drum of the scanner with respect to the fixed drum comprising the ramp. This solution is acceptable for small or moderate wrap angles.

In the device according to the present invention, the non rotatable drum comprising the helical guide or ramp is not a rigid element with a fixed helix but a resiliently deformable piece in order to permit a relatively weak modification of the angle of the helix. This deformation is normally executed by means of cams or independent servo-motors. This permits one to effect the correction of the tracking recording as well as while reading. It is easy to construct the device such that it will not exaggeratedly be disturbed by the accelerations and this construction is substantially more simple and more reliable than the one with rapid, mobile heads, principally if the latter are numerous.

Figure 8A:
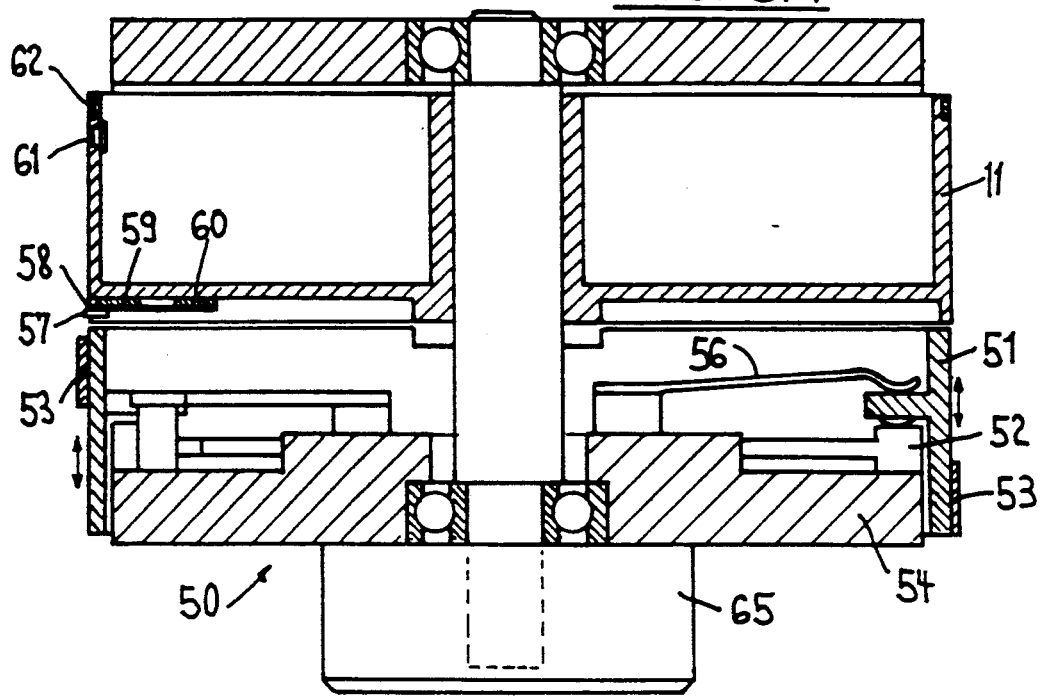
FIGS. 8A and 8B show the scanner with the helical ramp.
Figure 8B:
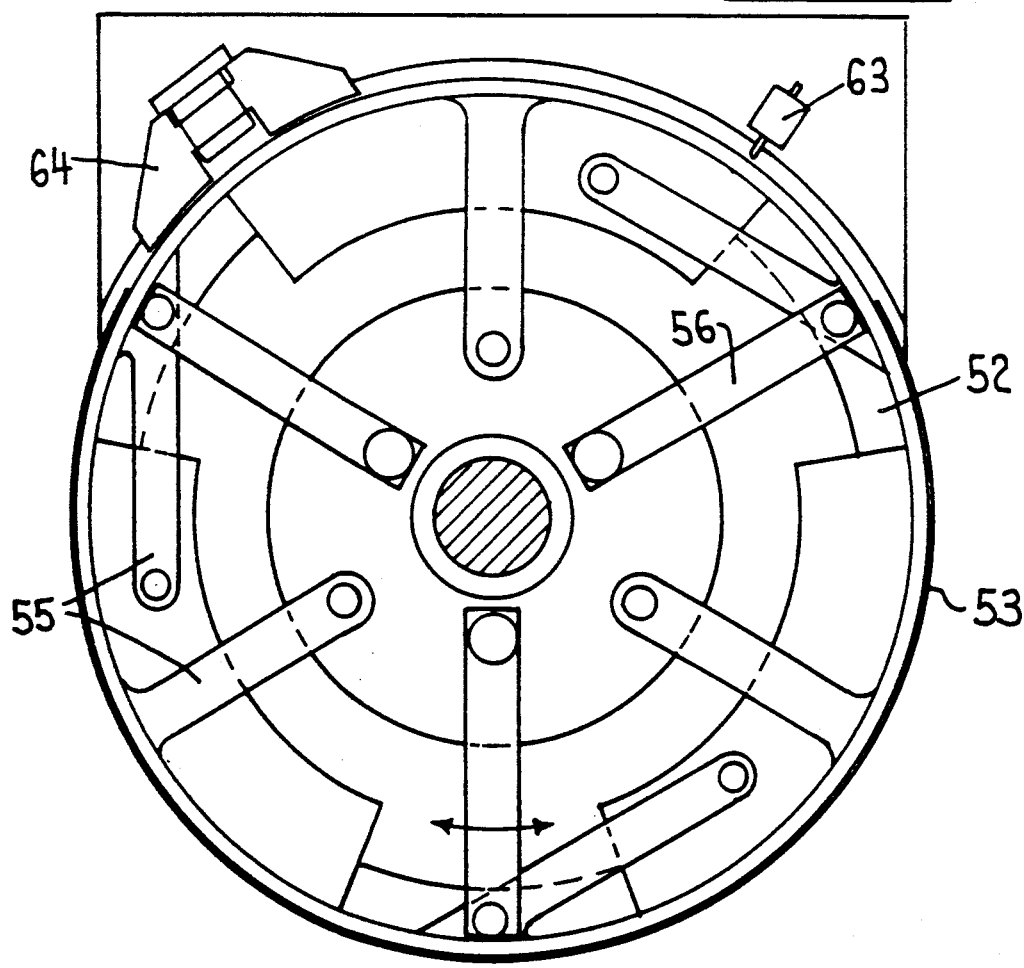

FIGS. 8A and 8B show a scanner with a helical ramp according to the invention, the angle of the helix being capable of being modified by resilient deformation of the fixed drum of the scanner. The scanner comprises an upper, rotatable drum 11 on which the tape is helically wound and a lower, non rotatable drum 51 bearing a helical ramp 53. The drum 51 can be resiliently deformed by the rotation of a cam 52 for permitting a small modification of the step of the helix, typically of 45 micrometer in the direction of the vertical arrows. This modification of the step of the helix is equivalent to a modification of the angle of the helical ramp. FIG. 8A shows that the rotatable drum 11 bears a tachometer wheel 62. This wheel is associated with a tachometric head 64, shown in FIG. 8B for detecting and evaluating the speed of rotation of the drum. As shown in FIGS. 8A and 8B, transducers 61 and 63 deliver one pulse per turn of the drum as a synchronizing pulse. The rotatable drum further comprises a magnetic recording or reading head 57 with its ceramic support 58. The head 57 can be adjusted vertically by a fine adjustment cam 59 and in the direction or azimuth by a fine adjustment cam 60. Blade springs 56 force the ramp bearing drum 51 to rest on the base 54 and resilient blades 55 provide for the centering and the angular positioning of the lower fixed ramp bearing drum 51. 65 is the driving motor of the rotatable upper drum 11.

The modification of the angle of the ramp of the helix necessitates a correction of the geometry of the movement of the tape. In the device according to the invention, this correction is executed by a small modification coordinated with the movement of the mobile ramp, of the direction of the axis of the capstan-guides. This adjustment is executed by means of the cam 39 of FIG. 6 and of its control lever 84.

Let us now examine the conditions bound to the recordings at variable speed without notable modification of the relative speed between head and tape, modification which causes a corresponding modification difficult to be realized by the equalization circuits. For such recordings, by utilization of the ramp of variable geometry according to the invention or the known method of the axial displacement of the heads for correcting the tracking error (AST), it is easy to record at a whole fraction of the nominal speed ($\frac{1}{2}$, $\frac{1}{3}$, $\frac{1}{4}$, etc.), the head executing one movement during which recording takes place and a certain number of void movements, without recording.

For certain applications, these fractional steps of speed are too coarse. It is possible to make them finer by switching the heads, which means by altering their natural working order. It is then necessary to displace them very slightly axially in order to correct the tracking error.

Figure 9:
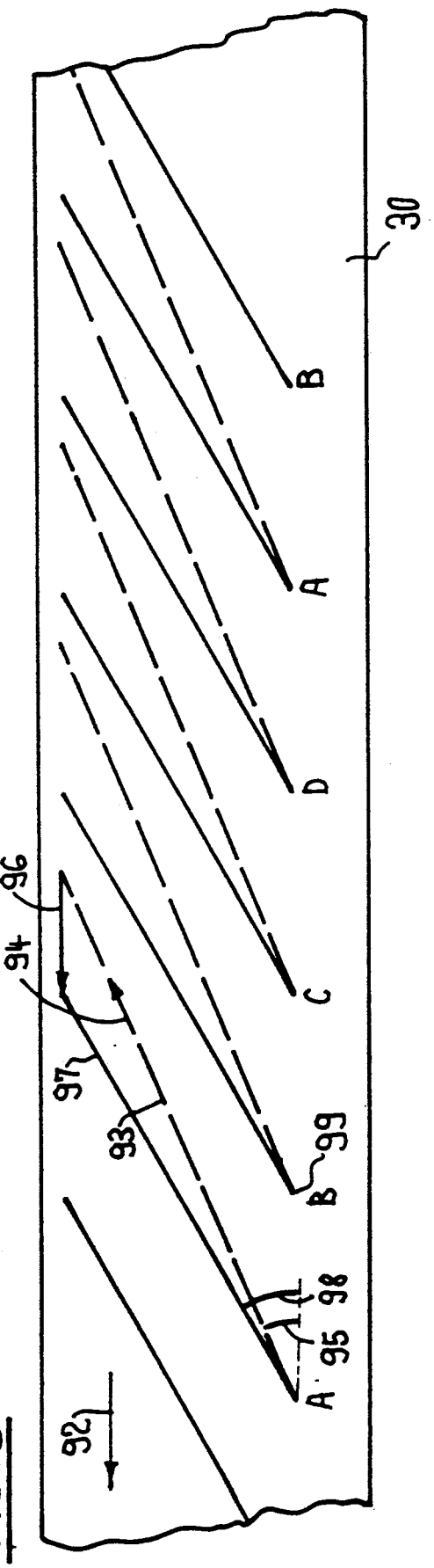
FIG. 9 shows the face of a tape on which recordings have been made by rotating heads.

FIG. 9 shows the recorded face of a tape by means of rotatable heads. The magnetic tape or the tape of a different kind 30 moves according to the direction 92, from the right hand side to the left hand side in the Figure. It is scanned by heads A, B, C and D (four in this example) which, if the tape would be stationary, would follow the path 93, by displacing themselves in the direction 94 which makes an angle 95 with the lower edge of the tape. But, as during the duration of one sweep by one by the heads, the tape has been shifted of the distance 96, the track recorded on the tape is represented by 97, this track making an angle 98 with the edge of reference of the tape.

These tracks 97 on the tape which are normalized and at the time of recording at different speed of the tape, the track recorded on the latter must, always be identical to the one which would be recorded in the nominal conditions.

Let us suppose now that the tape moves at a speed lower than the nominal speed. During a sweep, the advance 96 will be smaller. In order for the track 97 on the tape to be of the normalized angle, it is necessary that the path 93 from the head has an angle which differs of the nominal angle. This can be done by an axial motion of the head (method AST) or by a modification of the guiding angle by the ramp of variable geometry in accordance with the invention.

For the further description, one can admit that for each moving speed of the tape one adopts a determined angle of the ramp in order for the track on this tape to be of the correct angle. It is then sufficient for the following description to consider only the point 99 of the beginning of the track.

In the example of FIG. 9, four recording heads A, B, C and D act successively on the tape. For one turn of the scanner, four tracks, one per head are recorded.

Figure 10:
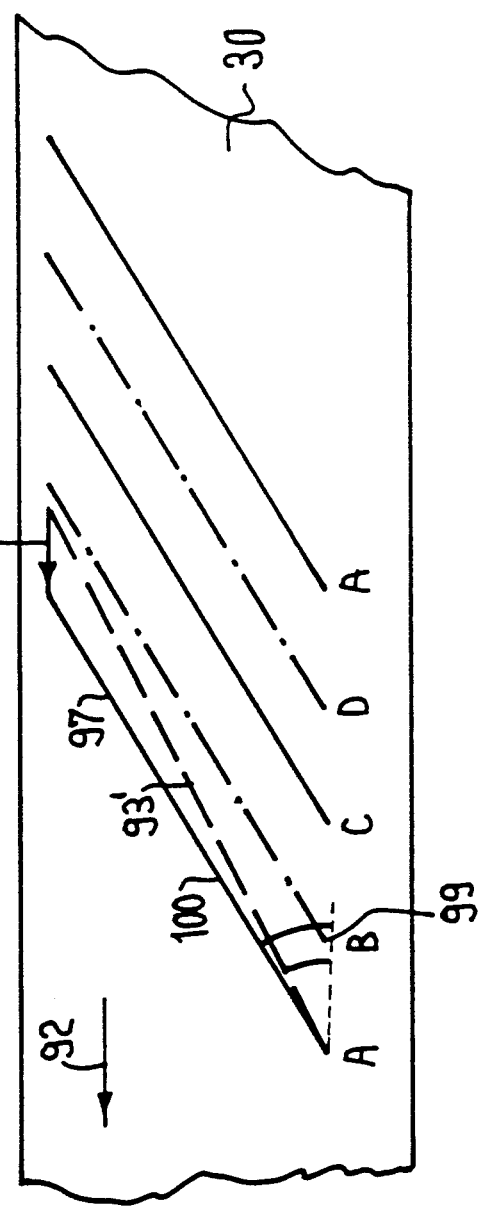
FIG. 10 shows the recorded tracks in the case of a moving speed of the tape reduced by 50%.

If it is assumed that the heads are always fed in this same order (A, B, C and D) for recording their bursts, the next step of speed that it is possible to obtain is $\frac{1}{2}$. The tape must then move at half the nominal speed, the angle of the ramp or the angle obtained articifially by a movement of the heads would be according to the track 100 of FIG. 10. Its track, on a stationary tape would be 93', different from the track 93 of FIG. 9. But, as the longitudinal advance is halved like 96', the track 100 on the tape is again conformed to the normalized track 97.

Figure 11:
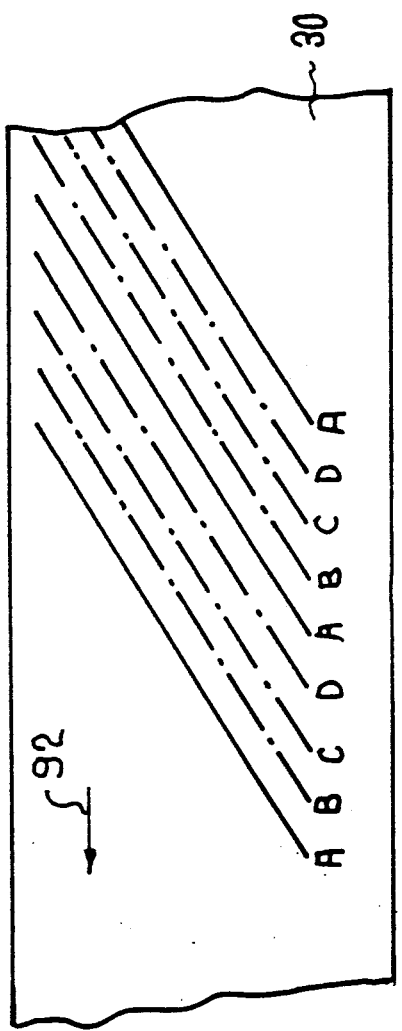
FIG. 11 shows the recorded tracks in the case of a moving speed of ¼ of the nominal speed.

At nominal speed, the next track would be recorded by the head B which starts its path at point 99 of FIG. 9. However, on FIG. 10, the tape has not advanced by the value 96 of FIG. 9 but in our case of the halvered value 96' of FIG. 10. If the head B would have been active, it would have started its path at point 99 of FIG. 10, which is not permitted because this path would run over the path of the head A. Hence, in this case, the head B will be rendered inactive and it would effect a void passage without recording. The next active head will be the head C which will record a track in parallel to the one of the head A track which, at nominal speed, would have been recorded by the head B. This example shows the possibility to record at half the nominal speed by rendering inactive one in two heads. Similarly, it would be possible to operate at $\frac{1}{4}$ of the nominal speed by rendering inactive three in four heads. FIG. 11 represents this case and it is visible that only the head A was active. If the recording speed should be $\frac{1}{8}$ of the nominal value, a single head would be recording every two sweeps. It is therefore easy to obtain recording speeds stepped in octaves.

However, if one seeks to obtain smaller steps of speed it is necessary to switch on the heads in a different way. Let us examine FIG. 12. It is desired to obtain tracks 101, 102, 103 and 104 of FIG. 12 with a moving speed comprised between $\frac{1}{2}$ and 1/1 of the nominal value or $\frac{3}{4}$ of the nominal value in this example. Head A records the trak 101 in a usual manner. When head B should start the recording on the tape, the latter has advanced of only $\frac{3}{4}$ of the nominal speed so that the head is not in the good position for recording the track 102. The Figure shows that one must displace axially the head B on the scanner of the amount indicated in FIG. 12.

The axial displacement of one head could give to think that this method is the same as the method AST. There exists however a fundamental difference between these two methods. The method AST has to be very rapid because the displacement is executed at each turn of the scanner, that is in a few milliseconds while in the method according to the invention, this displacement is done one for all at the time of choosing the speed before the recording. It can be done by a cm system (see magnetic head 57 with fine adjustment cam for the height of the head 59 in FIG. 8) driven by a servo-motor hence capable to support the accelerations and vibrations to which is submitted an embarked recording apparatus.

Figure 12:
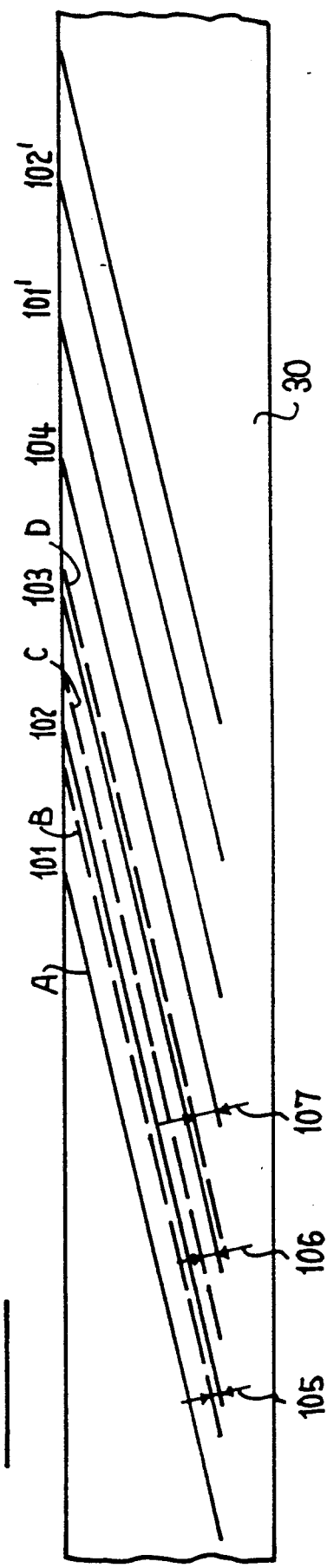
FIG. 12 shows the axial displacement of the recording heads on the scanner for small moving speeds of the tape.

Hence, the head B has been displaced by the value 105 in FIG. 12 which permits this head to record the track 102. In its turn, the head C is displaced by the value 106 and it records the track 103. The track 104 could have been recorded by the head D displaced by the value 107. However, this is useless because this track 104 will be recorded by the head A after one turn of the scanner because then this head A comes to coincide exactly with the track 104 when the tape has advanced of 4 segments of $\frac{3}{4}$ of nominal length each. Head D will effect a void passage, being not activated.

The preceding shows that the possibility according to the invention to displace axially the recording heads according to the desired longitudinal speed of the tape permits one to realize recordings with steps smaller than once octave. The axial displacement being adjusted one for all times before the recording as a function of the moving speed of the tape. On the other hand, the angle of the track on the tape is determined by the angle of the ramp as a function of the moving speed of the tape. Both measures lead to a construction of the device capable to resist advantageously to relatively high accelerations and vibrations.

We claim:

1. A device for recording/reproducing signals comprising at least one rotatable head for recording/reproducing said signals by helical scanning, comprising:
    a flexible support having a plurality of tracks on which said signals are recorded/reproduced by said rotatable head;
    a scanner with a rotatable drum bearing said at least one head, said flexible support being wound and shifted helically around said rotatable drum, said scanner further comprising a stationary drum bearing a helical ramp for laterally guiding said flexible support during its helical shifting around said rotatable drum; and
    said device further comprising means for producing a resilient deformation of said stationary drum to enable modification of the step and angle of the helix of the helical ramp to correct for errors in the scanning of said tracks due to a modification of the moving speed of said flexible support.

2. A device according to claim 1, further comprising capstans and means for adjusting the inclination of the axis of said capstans relative to the axis of said scanner to thereby optimally adjust the geometry of the motion of said flexible support.

3. A recording/reproducing device according to claim 1, wherein said at least one rotatable head comprises
    a plurality of rotatable heads capable of recording at a plurality of speeds on said flexible support;
    said device further comprising means for selectively activating said heads in a preferred order; and
    means for axially shifting said heads before recording on said flexible support, wherein the amount of axial shift corresponds to the recording speed to enable the path of said heads to coincide with one of said tracks on said flexible support to enable recording at speeds having a relative mutual separation smaller than octaves.

* * * * *